United States Patent
Tamura et al.

(10) Patent No.: US 6,235,408 B1
(45) Date of Patent: May 22, 2001

(54) LAMINATE STRUCTURE

(75) Inventors: Toshihiro Tamura, Sakurai; Tsuyoshi Tamura, Nara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/262,054

(22) Filed: Mar. 4, 1999

(30) Foreign Application Priority Data

Mar. 6, 1998 (JP) .................................................. 10-054726

(51) Int. Cl.⁷ ...................................................... B32B 15/08
(52) U.S. Cl. ........................... 428/626; 428/156; 428/170; 428/172
(58) Field of Search .................... 428/626, 156, 428/170, 172

(56) References Cited

FOREIGN PATENT DOCUMENTS

760777    3/1995  (JP) .

*Primary Examiner*—Francis J. Lorin (57) ABSTRACT

A laminate structure includes a base material made of a resin and a laminate material made of a metal, the laminate material being laminated as one or more plating layers on one surface or on both surfaces of the base material, wherein the laminate material has a flexural modulus of elasticity larger than that of the base material and has a thickness such that a changing rate of rigidity relative to the thickness ratio of the laminate material in the total laminate structure is larger than a changing rate of weight.

15 Claims, 8 Drawing Sheets

single material

Fig. 2 (b)

laminate material

Fig. 3 (a)  single material

Fig. 3 (b)  laminate material

LAMINATE STRUCTURE

CROSS-REFERENCES TO RELATED APPLICATIONS

This application is related to Japanese patent application No. HEI 10(1998)-054726 filed on Mar. 6, 1998 whose priority is claimed under 35 USC §119, the disclosure of which is incorporated herein by reference in its entirety.

BACKGROUND OF THE INVENTION

1. Field of the Invention

The present invention relates to a laminate structure, and more particularly to an extremely thin, highly rigid, and light laminate structure for use as a resin molded article in a portable information terminal device, a portable electronic device, or the like. The laminate structure is composed of two or more different materials and is a structure formed, for example, by performing a metal material plating on a resin.

2. Description of the Related Art

Today, a thinner and shorter resin molded article is demanded for use, for example, in a portable information terminal or an electronic device. However, as long as a conventional resin is used as it is, there is a fear that the flexural rigidity or the impact resistance decreases if the thickness of the resin molded article is reduced. Therefore, it is necessary to newly fabricate a resin molded article whose rigidity or impact resistance does not decrease even if the thickness of the resin molded article is reduced. For that purpose, it is necessary to select a material having a more excellent flexural modulus of elasticity than the conventional molded article material, as well as ensuring the rigidity of the conventional resin molded article. In view of this, various disclosures and proposals are known as methods for raising the rigidity of the molded article as well as reducing its thickness and weight.

(1) Japanese Unexamined Patent Publication No. Hei 07(1995)-60777 discloses use of a metal material or a reinforced resin material filled with a glass fiber or a carbon fiber as a molded article material.

(2) Japanese Unexamined Utility Model Publication No. Sho 62(1987)-62498 discloses an electromagnetic wave shielding material formed by laminating a thin steel plate through the intermediary of an adhesive applied on at least one surface of a dielectric sheet or an electrically conductive sheet as a molded article material.

(3) "Guidebook For Plating Technique" (published by Tokyo Plating Material Cooperative Association, 1987) discloses use of a metal plating for overcoming the problems inherent in a plastic when the plastic is used in a molded article.

However, the techniques disclosed in the above documents have the following problems.

In the case of (1) mentioned above, a reinforced resin material filled with a glass fiber or a carbon fiber is used as a molded article material. However, the reinforced resin material has a poor fluidity at the time of molding, so that it is difficult to mold it into a thin and complex shape. Also, the reinforced resin material has a lower breaking strain as compared with a base material resin used alone and has a fragile property, so that the impact resistance decreases. Further, the reinforced resin material has an increased weight due to the fiber introduced in the resin material, so that it is difficult to reduce the weight and the material costs are high.

In the case of (2) mentioned above, a thin steel plate can be laminated through the intermediary of an adhesive on a dielectric sheet of a simple shape. However, it is difficult to laminate a thin steel plate on a dielectric sheet of a complex shape, and the laminated thin steel plate is likely to be crinkled. Also, by simply laminating the thin steel plate thereon, the weight may increase, so that a suitable thickness must be defined.

In the case of (3) mentioned above, the applied metal plating is used for the following functional purposes:

(1) To give an aesthetic appearance to heighten its decorative value;
(2) To improve the corrosion resistance to prolong its life;
(3) To give abrasion resistance and lubricity to maintain a function as a component for a long period of time;
(4) To heighten the electric conductivity;
(5) To heighten the electric and magnetic properties;
(6) To give properties of reflecting and absorbing light;
(7) To give properties such as heat resistance, heat absorption, heat conduction, and heat reflection; and
(8) To utilize it as an auxiliary means in a machining process to contribute to resource saving and reduction of the number of processing steps.

The metal plating applied to a plastic for the above-mentioned purposes has a thickness as small as 10 $\mu$m (0.01 mm) or less and it merely modifies the resin surface.

SUMMARY OF THE INVENTION

The present invention has been made in view of these circumstances and the purpose thereof is to provide a thin and light laminate structure that can ensure the rigidity of materials by performing a metal material plating on a resin molded article made of an ordinary resin mold material without using a reinforced resin material filled with a glass fiber or a carbon fiber.

Accordingly, the present invention provides a laminate structure comprising a base material made of a resin and a laminate material made of a metal, the laminate material being laminated as one or more plating layers on one surface or on both surfaces of the base material, wherein the laminate material has a flexural modulus of elasticity larger than that of the base material and has a thickness such that a changing rate of rigidity relative to the thickness ratio of the laminate material in the total laminate structure is larger than a changing rate of weight.

In other words, the present invention makes it possible to effectively obtain a thin and light laminate structure having an excellent rigidity by setting the flexural modulus of elasticity of the laminate material to be larger than that of the base material and setting the thickness of the laminate material so that the changing rate of rigidity relative to the thickness ratio of the laminate material in the total laminate structure is larger than the changing rate of weight.

BRIEF DESCRIPTION OF THE DRAWINGS

The present invention will be better understood from the following detailed description of preferred embodiments of the invention, taken in conjunction with the accompanying drawings, in which.

DETAILED DESCRIPTION OF THE PREFERRED EMBODIMENTS

The laminate structure as an object of the present invention comprises a base material made of a resin and a laminate material made of a metal. The laminate material is laminated as one or more plating layers on one surface or on both surfaces of the base material.

Here, the resin of the base material may be, for example, acrylonitrile-butadiene-styrene (ABS) resin, polycarbonate (PC) resin, polypropylene (PP) resin, polyacetal (POM) resin, polyamide (PA) resin, polybutylene-terephthalate (PBT) resin, -polyphenylene oxide (PPO) resin or a mixture thereof (such as ABS/PBT or ABS/PC). The base material may be molded by injection molding, compression molding, extrusion molding, or the like using one or more of these resins, although the molding methods are not specifically limited.

The laminate material is formed as one or more layers by performing a metal plating on one surface or on both surfaces of the base material. The metal to be used for the plating is preferably Cu, Cr, Fe, or Ni though the metal to be used is not specifically limited as long as it can be plated generally on a resin. A method for plating may be, for example, electrolytic plating, nonelectrolytic plating, or a mixture of these methods (different methods for different layers).

In the present invention, the flexural modulus of elasticity (the ratio of a flexural stress as applied to a test piece within its elastic limit, relative to the strain) of the laminate material is set to be larger than the flexural modulus of elasticity of the base material, and the thickness of the laminate material is set so that the changing rate of rigidity relative to the thickness ratio of the laminate material in the total laminate structure is larger than the changing rate of weight.

Further, in the laminate structure of the present invention, the flexural modulus of elasticity of the base material is preferably set to be 1/15 or less of the flexural modulus of elasticity of the laminate material so as to actually obtain a thin and light structure having an excellent rigidity.

In the laminate structure of the present invention in which the layers of the laminate material are laminated on both surfaces of the base material, the changing rate of rigidity relative to the thickness ratio of the laminate material in the total laminate structure is preferably larger by at least 1% than the changing rate of weight, and the thickness ratio of the laminate material in the total laminate structure is preferably 25% or less, more preferably 5% or less.

In the laminate structure of the present invention in which the layers of the laminate material are laminated on one surface of the base material, the changing rate of rigidity relative to the thickness ratio of the laminate material in the total laminate structure is preferably larger by at least 1% than the changing rate of weight, and the thickness ratio of the laminate material in the total laminate structure is preferably 6% or less, more preferably 3% or less.

The laminate structure of the present invention can be advantageously used, for example, as a casing (a body case or an external box) for portable information terminal devices, portable communication terminal devices, and other electronic devices.

In such a casing for a portable device, the base material may be set to have a thickness of 0.3 to 10 mm, preferably 0.5 to 6 mm; the laminate material may be set to have a thickness of 0.015 mm to 2.5 mm, preferably 0.025 to 1.2 mm, more preferably 0.025 to 0.3 mm, in the case where the laminate material is laminated on both surfaces of the base material; and the laminate material may be set to have a thickness of 0.009 mm to 0.6 mm, preferably 0.015 to 0.36 mm, more preferably 0.015 to 0.18 mm, in the case where the laminate material is laminated on only one surface of the base material, because of the practical needs to make the casing thin and light so that it is portable while maintaining an excellent rigidity so that it can withstand possible fall or collision, although their thicknesses may depend on the mutual relationship between the base material and the laminate material in physical properties, dimension, and shape.

Hereafter, a laminate structure according to the present invention will be explained with reference to the drawings and tables.

First, an explanation will be given on a basic principle of rigidity and weight in the case where a different material having a different flexural modulus of elasticity is laminated in accordance with the present invention.

Figure 1:
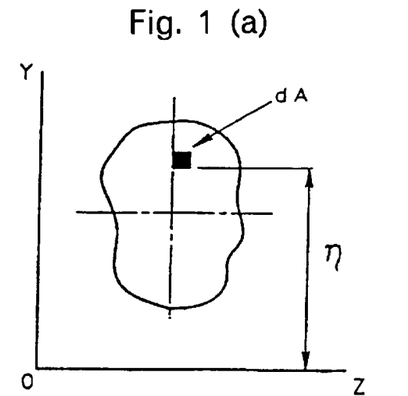
FIGS. 1(a) and 1(b) are views for showing a method of rigidity calculation.

Generally, rigidity of an object is given as a product EI of elasticity coefficient E and cross-sectional secondary moment I. Referring to FIG. 1(a), the cross-sectional secondary moment I of an arbitrary cross section with respect to an arbitrary axis OZ is defined by the following formula:

[Formula 1] (0-1)

$$I = \int_A \eta^2 dA$$

Here, ? is a distance from the OZ axis to a small area dA. For example, the rigidity of a rectangular cross section shown in FIG. 1(b) with respect to an axis passing through its center is represented by the following formula:

[Formula 2] (0-2)

$$I = \int_{-h/2}^{h/2} y^2 b\,dy = \frac{bh^3}{12}$$

Here, the position of the central axis differs between the case where the laminate material is laminated on both surfaces of the base material and the case where the laminate material is laminated only on one surface of the base material. In accordance therewith, the rigidity differs between these two cases. Therefore, the two cases must be considered separately. Hereafter, an explanation will be given on each of these two cases.

1) The case where a different material is laminated on both surfaces of a base material It is assumed that the thickness of the base material is $t_0$, the density of the base material is $\rho_0$, the flexural modulus of elasticity of the base material is $E_0$, the total thickness of the laminate structure is $t_n$ where the number of laminated layers is n in the laminate structure including one or more layers laminated on both surfaces of the base material, the thickness of the $i_{th}$ layer is $(t_i-t_{i-1})/2$, the density of the $i_{th}$ layer is $\rho_i$, the flexural modulus of elasticity of the $i_{th}$ layer is $E_i$, the width of the cross section of the laminate structure is b, and the depth (length in the rearward direction) of the laminate structure is d.

Figure 2:
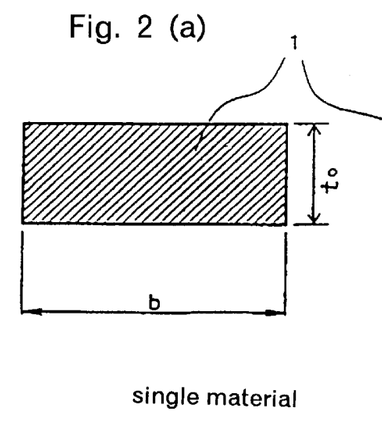
FIGS. 2(a) and 2(b) are cross-sectional views showing lamination of a laminate material on both surfaces of a molded article made of a single material according to the present invention.

FIGS. 2(a) and 2(b) show partial cross sections of the laminate structures. Here, the reference numerals 1, 2, and 3 represent the base material, the laminated layers, and the laminate structure, respectively. Generally, the rigidity is represented by a product of the flexural modulus of elasticity and the cross-sectional secondary moment, and the weight is represented by a product of the density and the volume. Therefore, the rigidity of the laminate structure in which the base material 1 has a thickness of $t_0$ and the total material 3 (the base material and the total laminate materials) has a thickness of $t_n$ is represented by a sum of the flexural rigidity of the base material 1 and the flexural rigidity of the laminate materials 2. Each flexural rigidity can be determined by the following formulas (1-1) to (1-6).

Flexural rigidity of the base material

[Formula 3] (1-1)

$$G_0 = E_0 \cdot \frac{b \cdot t_0^3}{12}$$

Flexural rigidity of the laminate material

[Formula 4] (1-2)

$$G_n = \sum_{i=1}^{n}\left(Ei \cdot \left(\frac{b \cdot t_i^3}{12} - \frac{b \cdot t_{i-1}^3}{12}\right)\right)$$

Weight of the base material

[Formula 5] (1-3)

$$W_0 = \rho_0 \cdot t_0 \cdot b \cdot d$$

Weight of the laminate material

[Formula 6] (1-4)

$$W_n = \sum_{i=1}^{n}(\rho_1 \cdot (t_i - t_{i-1}) \cdot b \cdot d)$$

Rigidity of the laminate structure (the base material and the total laminate materials)

[Formula 7]

$$G = G_0 + G_n \quad (1-5)$$

Weight of the laminate structure (the base material and the total laminate materials)

[Formula 8]

$$W = W_0 + W_n \quad (1-6)$$

A thin and light laminate structure having an excellent rigidity can be obtained by determining the ratio of the thickness from the changing rates of rigidity and weight relative to the thickness ratio of the base material 1 and the laminate materials 2 by using the above-mentioned formulas.

2) The case where a different material is laminated on only one surface of a base material In the same manner as in the above 1), it is assumed that the thickness of the base material is to, the density of the base material is $\rho_0$, the flexural modulus of elasticity of the base material is $E_0$, the total thickness of the laminate structure is $t_n$ where the number of laminated layers is n in the laminate structure including one or more layers laminated only on one surface of the base material, the thickness of the $i^{th}$ layer is $(t_i-t_{i-1})$, the density of the $i_{th}$ layer is $\rho_i$, the flexural modulus of elasticity of the $i_{th}$ layer is $E_i$, the width of the cross section of the laminate structure is b, and the depth (length in the rearward direction) of the laminate structure is d.

Figure 3:
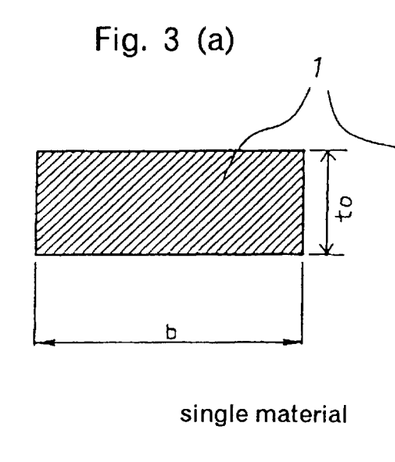
FIGS. 3(a) and 3(b) are cross-sectional views showing lamination of a laminate material on one surface of a molded article made of a single material according to the present invention.

FIGS. 3(a) and 3(b) show partial cross sections of the laminate structures. In this case also, the rigidity of the laminate structure in which the base material 1 has a thickness of $t_0$ and the total material 3 (the base material and the total laminate materials) has a thickness of $t_n$ is represented by a sum of the flexural rigidity of the base material 1 and the flexural rigidity of the laminate materials 2. Each flexural rigidity can be determined by the following formulas (2-0) to (2-6). Position of the central axis (It is assumed that the thickness from the bottom surface of the base material to the central axis is x, and n layers are laminated.)

[Formula 9] (2-0)

$$x = \frac{\rho_0 t_0^2 + \sum_{i=1}^{n}(\rho_i(t_i - t_{i-1})^2)}{2\left(\rho_0 t_0 + \sum_{i=1}^{n}(\rho_i(t_i - t_{i-1}))\right)}$$

Flexural rigidity of the base material

[Formula 10]

$$G_0 = E_0 \cdot \int_{-x}^{t_0-x} y^2 b\, dy \qquad (2\text{-}1)$$

Flexural rigidity of the laminate material

[Formula 11]

$$G_n = \sum_{i=1}^{n}\left( Ei \cdot \left( \int_{t_{i-1}}^{t_i-x} y^2 b\, dy \right) \right) \qquad (2\text{-}2)$$

Weight of the base material
[Formula 12]

$$W_0 = \rho_0 \cdot t_0 \cdot b \cdot d \qquad (2\text{-}3)$$

Weight of the laminate material

[Formula 13]

$$W_n = \sum_{i=1}^{n} (\rho_i \cdot (t_i - t_{i-1}) \cdot b \cdot d) \qquad (2\text{-}4)$$

Rigidity of the laminate structure (the base material and the total laminate materials)
[Formula 14]

$$G = G_0 + G_n \qquad (2\text{-}5)$$

Weight of the laminate structure (the base material and the total laminate materials)
[Formula 15]

$$W = W_0 + W_n \qquad (2\text{-}6)$$

A thin and light laminate structure having an excellent rigidity can be obtained by determining the ratio of the thickness from the changing rates of rigidity and weight relative to the thickness ratio of the base material 1 and the laminate materials 2 by using the above-mentioned formulas.

Hereafter, Examples of the present invention will be given in which an optimal laminate layer thickness range is calculated as a trial test by determining the changing rates of rigidity and weight relative to the ratio of the thickness of the laminate material 2 in the total material 3 (the base material and the total laminate materials) from the above-mentioned formulas, and its utility has been confirmed by performing a metal plating on a resin base material 1 and measuring its flexural rigidity.

Here, the resins for the base material 1 and the metals for the laminate material 2 to be used in the following Examples are shown in Tables 1 and 2 together with their physical property values (flexural modulus of elasticity and density).

TABLE 1

| Resin | Specific Weight (g/cm³) | Flexural Modulus (kgf/cm²) |
|---|---|---|
| ABS | 1.21 | 23000 |
| ABS/PBT | 1.25 | 72000 |
| ABS/PC | 1.23 | 22000 |
| denatured PPO | 1.06 | 25000 |

TABLE 1-continued

| Resin | Specific Weight (g/cm³) | Flexural Modulus (kgf/cm²) |
|---|---|---|
| PC | 1.2 | 24000 |
| PP | 0.98 | 15000 |
| POM | 1.42 | 32000 |
| PA | 1.38 | 81000 |

TABLE 2

| Metal | Specific Weight (g/cm³) | Flexural Modulus (kgf/cm²) |
|---|---|---|
| Cu | 8.93 | 800000 |
| Ni | 8.85 | 1600000 |
| Cr | 7.19 | 2000000 |
| Zn | 7.12 | 750000 |
| Fe | 7.86 | 1600000 |
| Sn | 7.29 | 450000 |

FIRST EXAMPLE

A first Example of the present invention will be explained hereafter.

In this Example, an ABS resin is used as a resin material for the base material, and copper is used as a metal material for the laminate material. Hereafter, an explanation will be given on means and methods for determining the optimal thickness of Cu plating for obtaining a thin and light molded article having a high rigidity for a portable telephone and the like by performing a copper plating on both surfaces of the molded article of the ABS resin.

Figure 4:
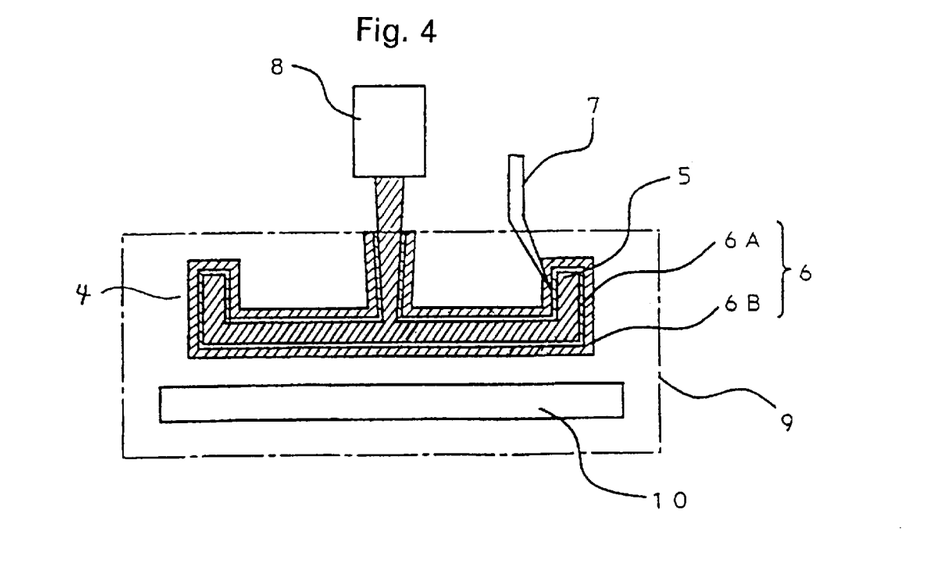
FIG. 4 is a view for explaining a molding means of metal plating on a resin molded article according to the present invention.

FIG. 4 is a view showing an apparatus for performing a metal plating on a base material, in which a laminate structure 4, a resin molded article 5 as the base material, a metal plating layer 6 as the laminate material, a metal plating layer 6A, a metal plating layer 6B, an electrode 7, a fixation jig 8, a plating bath 9, and an opposing electrode 10 are shown.

The ABS resin as the base material 5 to be used in the present invention has physical properties shown in Table 1 and is equivalent to the material used for a casing of portable telephones. As to the burning property, those equivalent to HB are used. Here, it is assumed that the total thickness of the laminate structure 4 (combined thickness of the base material and the total laminate materials) is 1 mm for explanation purposes.

The plating layer as the laminate material 6 includes the metal plating layer 6A formed by non-electrolytic plating and the metal plating layer 6B formed by electroplating as shown by a metal plating layer 6 of FIG. 4. However, since these two layers are both composed of copper, they can be regarded as one copper layer. Therefore, in this Example, a laminate structure including only one plating layer will be explained for simplicity of explanation, The same results would be obtained in the case of two or more laminate layers when a trial calculation is made in accordance with the formulas (1-1) to (1-6) given in 1) of the above-mentioned basic principle. For example, if Cr plating is to be carried out on the resin base material 5, a non-electrolytic Ni plating is sometimes carried out before conducting the Cr plating, because a direct Cr plating would result in poor adhesion. Therefore, this explanation would apply to a multi-layer laminate.

Hereafter, a concrete trial calculation method will be explained.

The density $\rho_0$ of the ABS resin molded article 5 as the base material, the flexural modulus of elasticity $E_0$ of the base material, the density $\rho_1$ of the copper layer 6 as the laminate material, the flexural modulus of elasticity $E_1$ of the copper layer 6, the width b of the cross section of the laminate structure (the molded article), the depth d (the length in the rearward direction) of the laminate structure, and the total thickness $t_1$ of the laminate structure (the combined thickness of the base material and the total laminate materials) in which only one layer is laminated on both surfaces of the base material are assumed to be as follows.

$\rho_0$=1.21 g/cm$^3$ $E_0$=23000 kgf/cm$^2$ $\rho_1$=8.93 g/cm$^3$ $E_1$=800000 kgf/cm$^2$ b=10 mm d=10 mm $t_1$=1 mm Calculation is made using the formulas given in 1) and raising the ratio of the thickness $(t_1-t_0)/2$ of the laminate materials 6 laminated on both surfaces of the base material 5, relative to the total thickness $t_1$ of the laminate structure 4 (the combined thickness of the base material and the total laminate materials), from 0% to 100.0% at intervals of 0.1%, i.e. when the thickness ratio is 0%, 0.1%, 0.2%, . . . , 100.0%.

Figure 5:
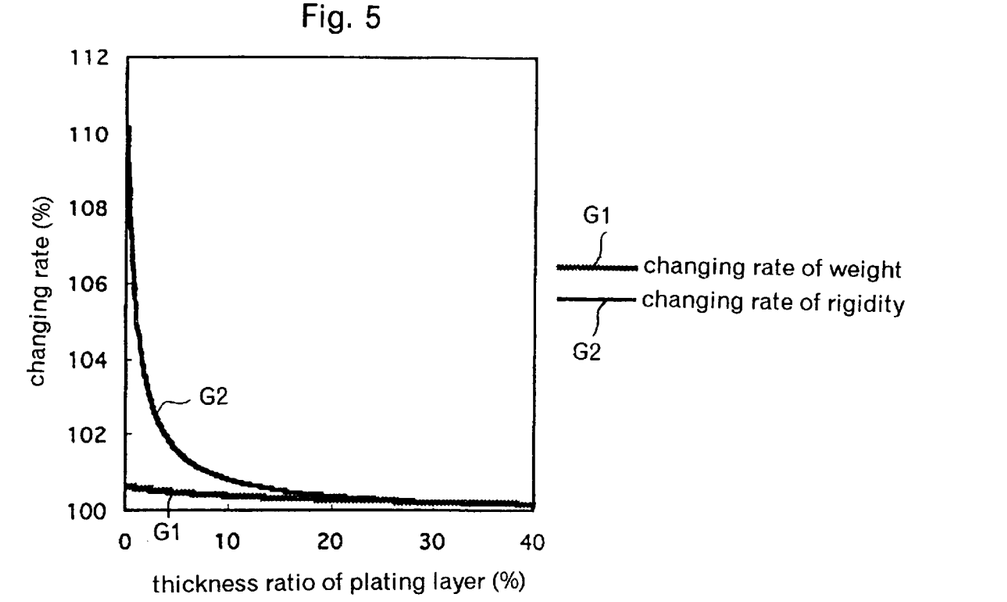
FIG. 5 is a graph showing a relationship of changing rates of rigidity and weight relative to the thickness ratio of a laminate material in a lamination on both surfaces according to the present invention.

FIG. 5 is a graph showing the results calculated under the above conditions, where the horizontal axis of the graph represents the thickness ratio of the plating layer 6 relative to the total thickness 1 mm $((t_1-t_0)/t_1)$ and the vertical axis of the graph shows the changing rate of weight (G1) and the changing rate of rigidity (G2). Actually, the changing rates are differences between adjacent numerical values of weight and rigidity as calculated at the above-mentioned intervals of 0.1%. This means that the changing rate of weight (G1) can be determined by $\partial W/\partial t$ and the changing rate of rigidity (G2) can be determined by $\partial G/\partial t$.

Referring to FIG. 5, the thickness ratio of the plating layer 6 at the intersection of the changing rate of weight (G1) and the changing rate of rigidity (G2) is 29.3%. In other words, even if the thickness of the plating layer 6 is increased to 29.3% or more, it will be a region where the effect of increase in rigidity and the effect of decrease in apparent weight due to the plating do not appear, since the changing rate of weight (G1) exceeds the changing rate of rigidity (G2). Therefore, in the case of an ABS resin and Cu plating, the thickness ratio of the plating layer to the total thickness must be 29.3% or less. Namely, for a total thickness of 1 mm, unless the sum of the thicknesses of the plating layers on both surfaces is 293 μm or less, the effect of increase in rigidity and the effect of decrease in apparent weight cannot be obtained by plating.

In the above case of the ABS resin and Cu plating shown in FIG. 5, the calculation was carried out by assuming the total thickness to be 1 mm. However, it has been found that calculation with any total thickness gives the same result indicating that the intersection of the changing rate of weight (G1) and the changing rate of rigidity (G2) is a constant value of 29.3%. Therefore, for any total thickness, the ratio of the sum of the thicknesses of the plating layers on both surfaces must be 29.3% or less.

Next, trial calculations were carried out for other resins and metals under the same conditions as shown above. The materials used for the calculations and their physical property values are shown in Tables 1 and 2. Examples of the results are shown in FIGS. 6 to 8.

Figure 6:
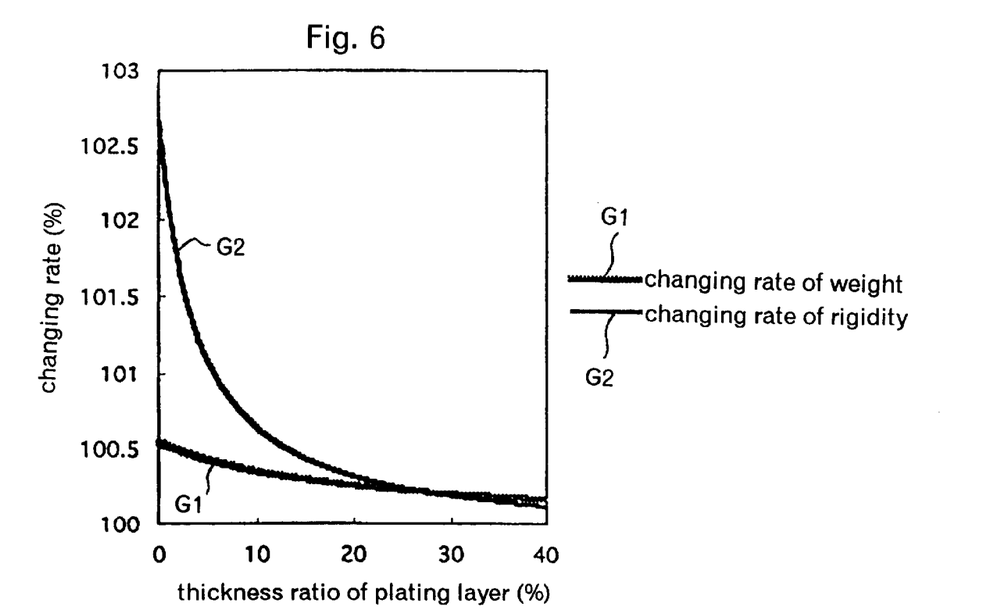
FIG. 6 is another graph showing a relationship of changing rates of rigidity and weight relative to the thickness ratio of a laminate material in a lamination on both surfaces according to the present invention.

Referring to FIG. 6, a PA resin was used as the base material instead of the ABS resin. It has been found out that, when the PA resin is used, the changing rate of rigidity (G2) obtained by Cu plating is small and the effects are small, since the flexural modulus of elasticity of the PA resin itself is large.

Figure 7:
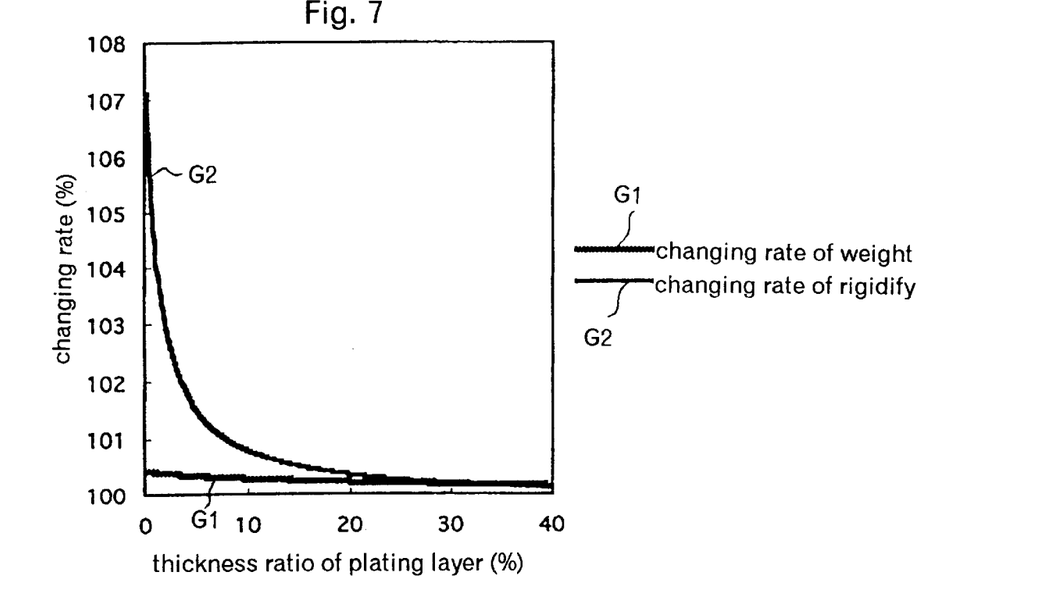
FIG. 7 is another graph showing a relationship of changing rates of rigidity and weight relative to the thickness ratio of a laminate material in a lamination on both surfaces according to the present invention.
Figure 8:
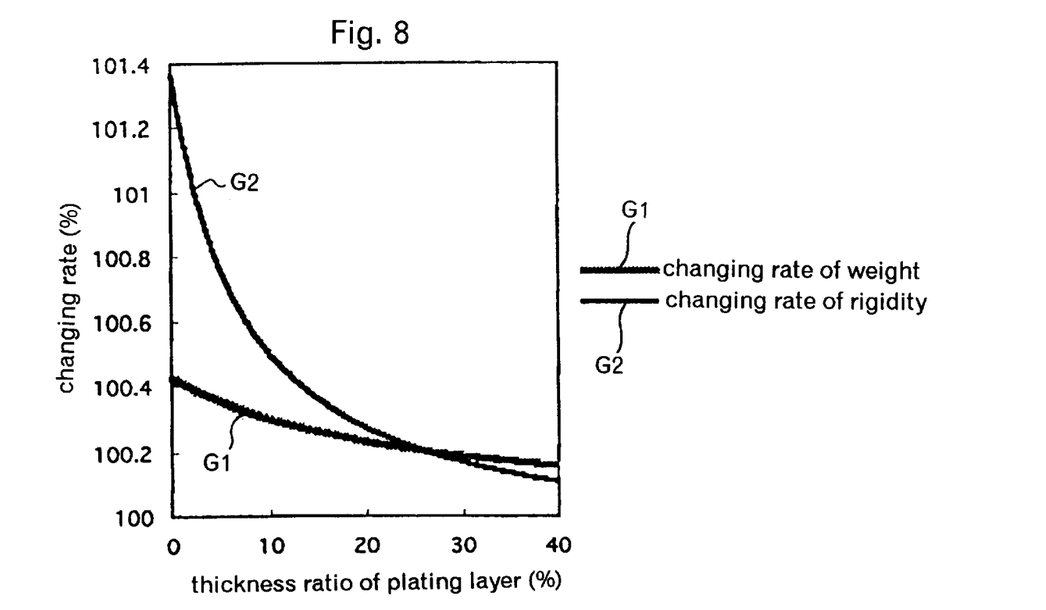
FIG. 8 is another graph showing a relationship of changing rates of rigidity and weight relative to the thickness ratio of a laminate material in a lamination on both surfaces according to the present invention.

Referring to FIG. 7, Cr plating was performed on a PA resin instead of Cu plating. As a result, effects of the same level as those of FIG. 5 were obtained Referring to FIG. 8, an Sn plating was performed on a PA resin. As a result, this case gave the smallest effects.

Table 3 shows thickness ratios of laminate materials at the intersections of the changing rate of rigidity and the changing rate of weight when a variety of materials shown in Tables 1 and 2 are used.

TABLE 3

| Resin<br>Metal | ABS | GF<br>reinforced<br>ABS/PBT | ABS/<br>PC | denatured<br>PPO | PC | PP | POM | PA |
| --- | --- | --- | --- | --- | --- | --- | --- | --- |
| Cu | 29.3 | 26.1 | 29.6 | 27.3 | 29.1 | 27 | 31.1 | 27.1 |
| Ni | 30.2 | 29 | 30.5 | 28.3 | 30.1 | 27.7 | 32.2 | 30.2 |
| Cr | 33.4 | 32.7 | 33.7 | 31.4 | 33.2 | 30.5 | 35.7 | 34.1 |
| Zn | 32.6 | 29.7 | 32.9 | 30.4 | 32.4 | 30 | 34.6 | 30.8 |
| Fe | 31.9 | 30.8 | 32.2 | 30 | 31.8 | 29.2 | 34.1 | 32.1 |
| Sn | 31.2 | 25.2 | 31.6 | 28.8 | 30.9 | 28.9 | 32.9 | 25.9 |

From this result, it is understood that the thickness ratio of the plating layers to the total thickness must be 25% or less for any combination of the base material and the laminate material. However, the greatest effects are obtained in the case where the difference between the changing rate of rigidity (G2) and the changing rate of weight (G1) is large, as explained above for FIGS. 5 to 8.

Table 4 shows the thickness ratio of the plating layers for the case where the difference between the changing rate of rigidity (G2) and the changing rate of weight (G1) is 1 % or more. Here, ○ represents a type which produces a great effect and is thus preferable for use, Δ represents a type which produces only a small effect but is capable of being used, and x represents a type which produces little effect and is thus not suitable for use.

TABLE 4

| Resin<br>Metal | ABS | GF<br>reinforced<br>ABS/PBT | ABS/<br>PC | denatured<br>PPO | PC | PP | POM | PA |
| --- | --- | --- | --- | --- | --- | --- | --- | --- |
| Cu | 5.5○ | 3.1X | 5.6○ | 5.2○ | 5.4○ | 5.5○ | 5.4○ | 2.9X |
| Ni | 6.1○ | 5○ | 6.1○ | 5.8○ | 6○ | 5.9○ | 6.1○ | 4.9Δ |
| Cr | 6.5○ | 5.7○ | 6.6○ | 6.3○ | 6.5○ | 6.3○ | 6.6○ | 5.7○ |
| Zn | 5.8○ | 3.4X | 5.9○ | 5.5○ | 5.8○ | 5.9○ | 5.7○ | 3.1X |
| Fe | 6.3○ | 5.2○ | 6.3○ | 6○ | 6.2○ | 6.1○ | 6.3○ | 5.1○ |
| Sn | 5○ | 0.5X | 5.1○ | 4.6Δ | 4.9Δ | 5.3○ | 4.6Δ | 0X |

From the above results, it is found out that, when a resin having a comparatively large flexural modulus of elasticity such as a PA or a glass fiber reinforced ABS/PBT is used as the base material 5, the effects are small. Also, it is found out that, when a metal having a comparatively small flexural modulus of elasticity such as Sn is used as the laminate material 6, the effects are small. However, the effects of increase in rigidity and decrease in apparent weight are obtained in the case where a material such as a PA or a glass fiber reinforced ABS/PBT is used as the base material 5 and a metal material 6 having a large flexural modulus of elasticity such as Cr, Fe or Ni is laminated thereon. Therefore, from Table 4, it is understood that the thickness of the laminate materials producing great effects of increase in rigidity and decrease in apparent weight is more preferably 5% or less of the total thickness for every case. In other words, in order to obtain greater effects as describe above, it is sufficient to select a material having a larger difference between the changing rate of rigidity (G2) and the changing rate of weight (G1).

On the other hand, by comparison in terms of flexural modulus of elasticity, it is understood that the flexural modulus of elasticity of the base material 5 is preferably $1/15$ or less of the flexural modulus of elasticity of the laminate material 6. This range includes all the types represented by the symbol ○ in the above Table 4.

Actually, the effects to be obtained will also be influenced by conditions such as the easiness of metal plating due to combination of the base material 5 and the laminate material 6. Therefore, it is preferable to select the best type for molding by considering such various conditions as well.

Next, samples actually having the above constructions were prepared for measurement of flexural modulus of elasticity. The samples contained an ABS resin as the base material 5 and Cu-plating layers as the laminate material 6, with the total thickness being 1 mm and the thickness ratio of the plating layers being 10% or less (at intervals of 1%). Preparation of the samples, the conditions of measurement, the method of measurement and the like were based on JIS (Japanese Industrial Standard) K 9611.

Figure 9:
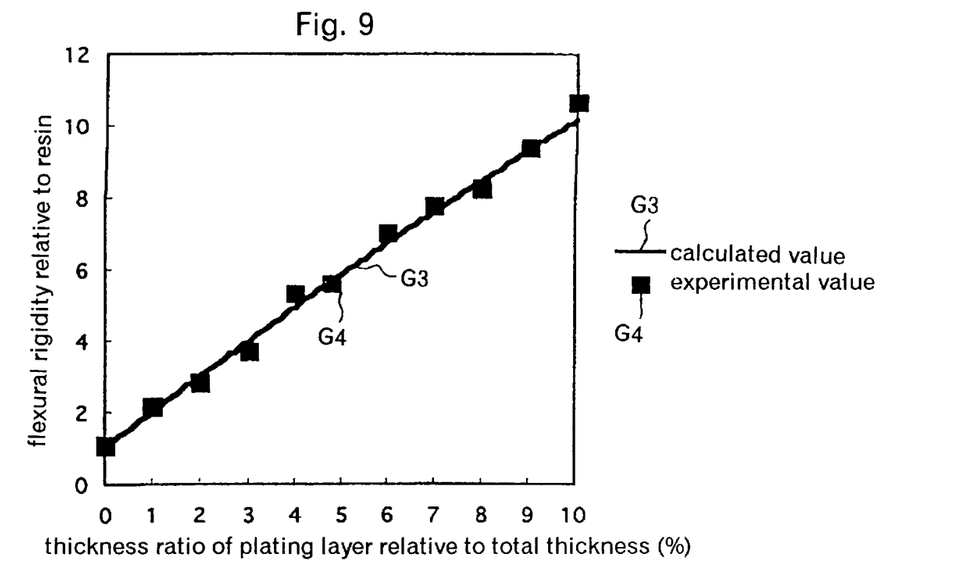
FIG. 9 is a graph showing a relationship between a relative flexural rigidity of a resin as a single body and the thickness ratio of a laminate material in a lamination on both surfaces according to the present invention.

FIG. 9 shows the results of this measurement and the results of calculation. From these results, it is understood that the measured values are almost identical to the calculated values and are within ±10% of the calculated values, so that discussions may be made based on the calculated values.

As shown above, it is preferable that the following conditions are satisfied in order to form the intended laminate structure.
1) The laminate material 6 is selected to have a larger flexural modulus of elasticity than the base material 5. Also, the materials are selected so that the changing rate of rigidity (G2) relative to the thickness ratio of the laminate material 6 in the total laminate structure 4 is larger than the changing rate of weight (G1). The thickness of the laminate material 6 is determined so that the changing rate of rigidity (G2) is larger than the changing rate of weight (G1).
2) Preferably, a combination of the materials is selected so that the flexural modulus of elasticity of the base material 5 is $1/15$ or less of the flexural modulus of elasticity of the laminate material 6.
3) More preferably, the materials are selected so that the changing rate of rigidity (G2) is larger than the changing rate of weight (G1) by at least 1% and the thickness ratio of the laminate material 6 in the total laminate structure 4 is 5% or less.

As shown above, according to the present invention, it is not necessary to use a reinforced material filled with a glass fiber or a carbon fiber having a poor fluidity for improvement of rigidity in a resin molded article, and an ordinary resin material can be used, thereby providing a good moldability for realizing a thin resin molded article. Also, since metal plating is used, the present invention can be carried out irrespective of the area of the resin molded article, and the costs of the materials can be reduced. Further, since the metal-plating layers have a higher flexural modulus of elasticity than the resin, the metal-plated resin molded article shows a great improvement in the flexural modulus of elasticity.

SECOND EXAMPLE

A second Example of the present invention will be explained hereafter.

In the above-mentioned first Example, copper plating was performed on both surfaces of a resin molded article to determine the optimal thickness of Cu plating for obtaining a thin and light molded article having a high rigidity for a portable telephone and the like. In this Example, an explanation will be given on a case in which the copper plating is performed only on one surface of a resin molded article. Since the apparatus and the materials used in this Example are similar to those of the Example 1, explanation of the same contents will be omitted and only the different contents will be explained.

Here, it is assumed that the total thickness of the laminate structure 4 (combined thickness of the base material and the total laminate materials) is 2 mm for explanation purposes, and a laminate structure including only one plating layer will be explained for simplicity of explanation. The explanation in this Example would apply also to a multi-layer laminate in the same manner as in the above-mentioned Example 1.

Hereafter, a concrete trial calculation method will be explained.

It is assumed that $\rho_1 = 8.93$ g/cm$^3$ $E_1 = 800000$ kgf/cm$^2$ $b = 10$ mm $d = 10$ mm $t = 2$ mm.

Calculation is made using the formulas (2-0) to (2-6) in 2) of the above-mentioned basic principle and raising the ratio of the thickness $(t_1-t_0)$ of the laminate material 6 laminated only on one surface of the base material 5, relative to the total thickness $t_1$ of the laminate structure 4 (the combined thickness of the base material and the total laminate material) from 0% to 100.0% at intervals of 0.1%, i.e. when the thickness ratio is 0%, 0.1%, 0.2%, . . . , 100.0%.

Figure 10:
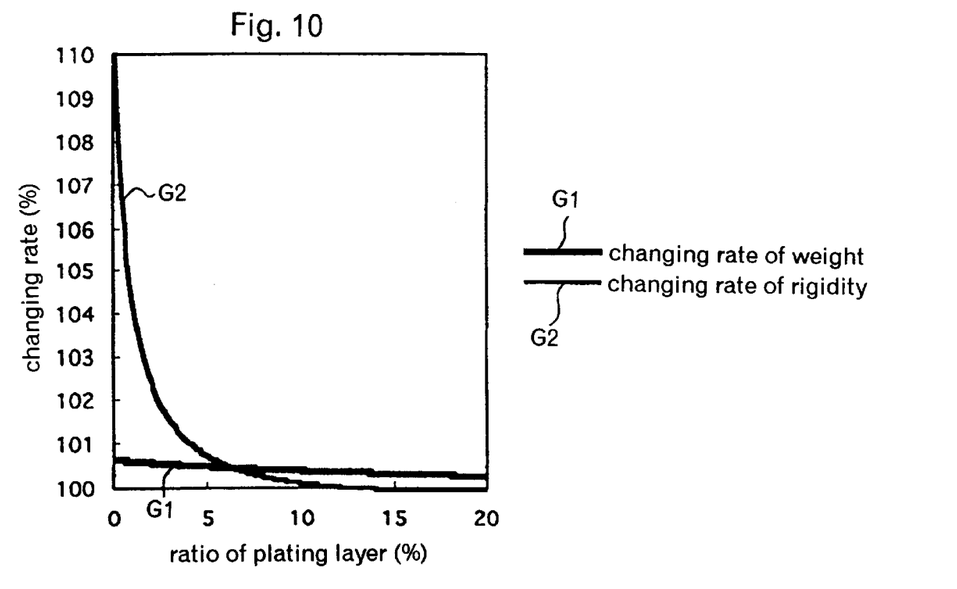
FIG. 10 is a graph showing a relationship of changing rates of rigidity and weight relative to the thickness ratio of a laminate material in a lamination on one surface according to the present invention.

FIG. 10 is a graph showing the results calculated under the above conditions, where the horizontal axis of the graph represents the thickness ratio of the plating layer 6 relative to the total thickness of 2 mm $((t_1-t_0)/t_1)$ and the vertical axis of the graph shows the changing rate of weight (G1) and the changing rate of rigidity (G2).

Referring to FIG. 10, the thickness ratio of the plating layer 6 at the intersection of the changing rate of weight (G1) and the changing rate of rigidity (G2) is 6.3%. In other words, even if the thickness of the plating layer 6 is increased to 6.3% or more, it will be a region where the effect of increase in rigidity and the effect of decrease in apparent weight due to the plating do not appear, since the changing rate of weight (G1) exceeds the changing rate of rigidity (G2). Therefore, in the case of an ABS resin and Cu plating, the thickness ratio of the plating layer to the total thickness must be 6.3% or less. Namely, for a total thickness of 2 mm, unless the sum of the thicknesses of the plating layers is 126 μm or less, the effect of increase in rigidity and the effect of decrease in apparent weight cannot be obtained by plating.

In the above case of the ABS resin and Cu plating shown in FIG. 10, the calculation was carried out by assuming the total thickness to be 2 mm. However, it has been found that calculation with any total thickness gives the same result indicating that the intersection of the changing rate of weight (G1) and the changing rate of rigidity (G2) is a constant value of 6.3%. Therefore, for any total thickness, the ratio of the sum of the thicknesses of the plating layers must be 6.3% or less.

Next, trial calculations were carried out for other resins and metals under the same conditions as shown above. The materials used for the calculations and their physical property values are shown in Tables 1 and 2. Examples of the results are partially shown in FIGS. 11 to 13.

Figure 11:
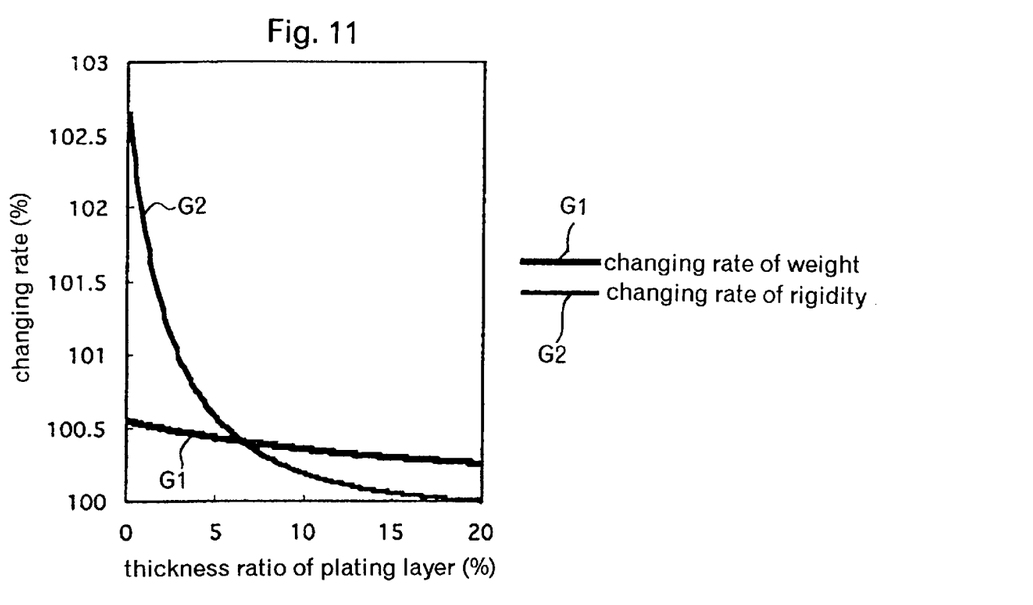
FIG. 11 is a graph showing another relationship of changing rates of rigidity and weight relative to the thickness ratio of a laminate material in a lamination on one surface according to the present invention.

Referring to FIG. 11, a PA resin was used as the base material instead of the ABS resin. It has been found out that, when the PA resin is used, the changing rate of rigidity (G2) obtained by Cu plating is small and the effects are small, since the flexural modulus of elasticity of the PA resin itself is large.

Figure 12:
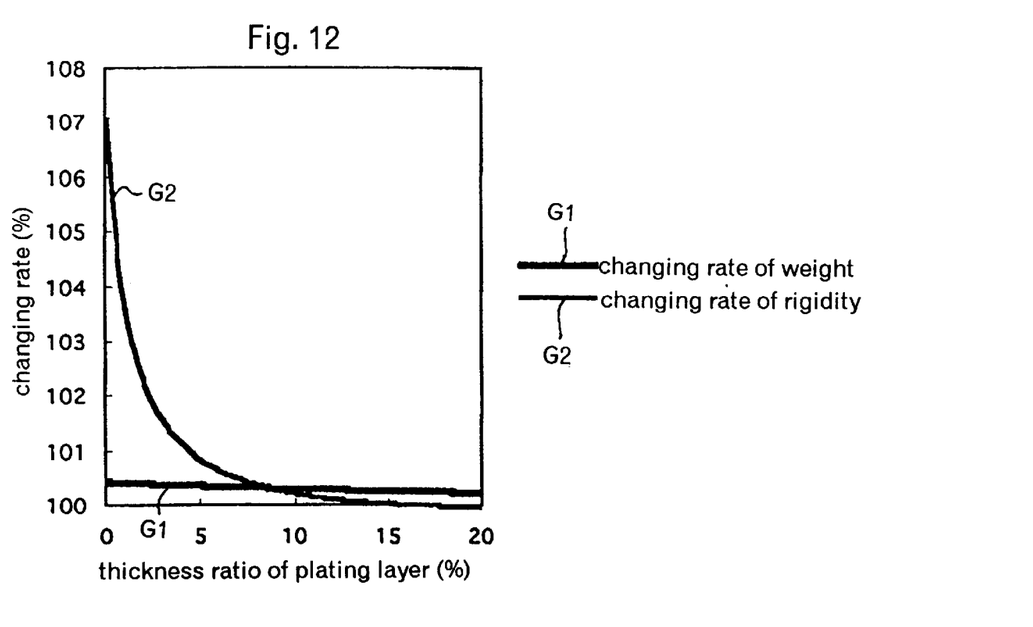
FIG. 12 is a graph showing another relationship of changing rates of rigidity and weight relative to the thickness ratio of a laminate material in a lamination on one surface according to the present invention.
Figure 13:
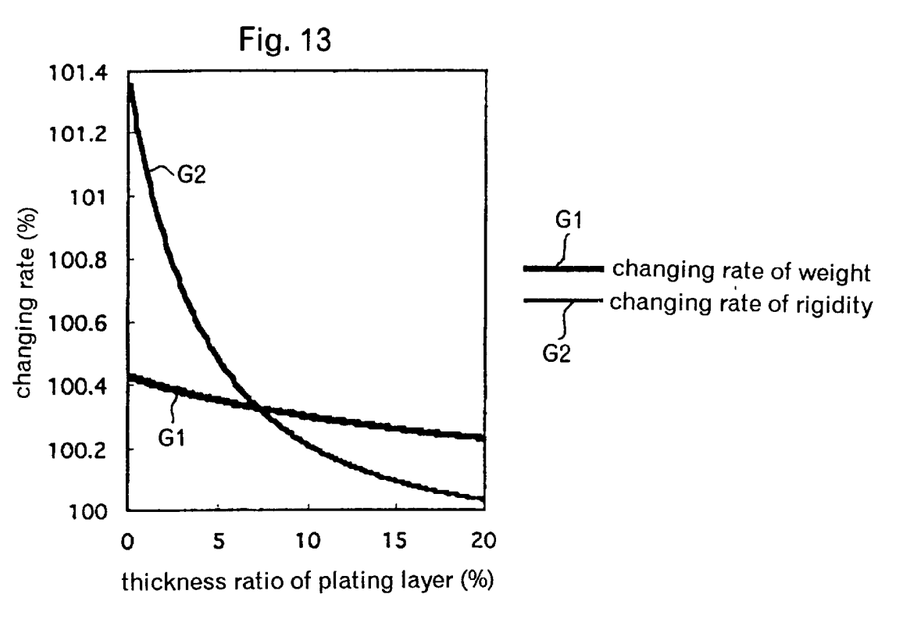
FIG. 13 is a graph showing another relationship of changing rates of rigidity and weight relative to the thickness ratio of a laminate material in a lamination on one surface according to the present invention.

Referring to FIG. 12, Cr plating was performed on a PA resin instead of Cu plating. As a result, effects of the same level as those of FIG. 10 were obtained Referring to FIG. 13, an Sn plating was performed on a PA resin. As a result, this case gave the smallest effects.

Table 5 shows thickness ratios of laminate materials at the intersections of the changing rate of rigidity and the changing rate of weight when a variety of materials shown in Tables 1 and 2 are used.

TABLE 5

| Resin Metal | ABS | GF reinforced ABS/PBT | ABS/ PC | denatured PPO | PC | PP | POM | PA |
|---|---|---|---|---|---|---|---|---|
| Cu | 6.3 | 6.1 | 6.4 | 5.5 | 6.3 | 5.2 | 7.3 | 6.6 |
| Ni | 6.5 | 6.4 | 6.6 | 5.7 | 6.4 | 5.3 | 7.5 | 7 |
| Cr | 7.9 | 7.9 | 8 | 7 | 7.8 | 6.5 | 9.1 | 8.7 |
| Zn | 7.8 | 7.5 | 7.9 | 6.9 | 7.7 | 6.5 | 9 | 8.2 |
| Fe | 6.2 | 7.2 | 7.4 | 6.4 | 7.2 | 6 | 8.4 | 7.9 |
| Sn | 7.5 | 6.8 | 7.6 | 7.6 | 7.4 | 6.2 | 8.5 | 7.3 |

From this result, it is understood that the thickness ratio of the plating layer to the total thickness must be 5% or less for any combination of the base material and the laminate material. However, the greatest effects are obtained in the case where the difference between the changing rate of rigidity (G2) and the changing rate of weight (G1) is large, as explained above for FIGS. 10 to 13.

Table 6 shows the thickness ratio of the plating layer for the case where the difference between the changing rate of rigidity (G2) and the changing rate of weight (G1) is 1% or more. Here, ○ represents a type which produces a great effect and is thus preferable for use, Δ represents a type which produces only a small effect but is capable of being used, and x represents a type which produces little effect and is thus not suitable for use.

TABLE 6

| Resin Metal | ABS | GF reinforced ABS/PBT | ABS/ PC | denatured PPO | PC | PP | POM | PA |
|---|---|---|---|---|---|---|---|---|
| Cu | 3○ | 1.7X | 3.1○ | 2.7Δ | 3○ | 2.8Δ | 3.1○ | 1.6X |
| Ni | 3.4○ | 2.7Δ | 3.4○ | 3.1○ | 3.3○ | 3.1○ | 3.6○ | 2.8Δ |
| Cr | 3.9○ | 3.3○ | 4○ | 3.6○ | 3.9○ | 3.6○ | 4.1○ | 3.4○ |
| Zn | 3.4○ | 1.9X | 3.5○ | 3.1○ | 3.4○ | 3.3○ | 3.4○ | 1.8X |
| Fe | 3.6○ | 2.9Δ | 3.7○ | 3.3○ | 3.6○ | 3.3○ | 3.8○ | 3○ |
| Sn | 2.9Δ | 0.3X | 3○ | 2.5Δ | 2.8Δ | 2.9Δ | 2.7Δ | 0X |

From the above results, it is found out that, when a resin having a comparatively large flexural modulus of elasticity such as a PA or a glass fiber reinforced ABS/PBT is used as the base material 5, the effects are small. Also, it is found out that, when a metal having a comparatively small flexural modulus of elasticity such as Sn is used as the laminate material 6, the effects are small. However, the effects of increase in rigidity and decrease in apparent weight are obtained in the case where a material such as a PA or a glass fiber reinforced ABS/PBT is used as the base material 5 and a metal material 6 having a large flexural modulus of elasticity such as Cr, Fe or Ni is laminated thereon. Therefore, from Table 6, it is understood that the thickness of the laminate materials producing great effects of increase in rigidity and decrease in apparent weight is more preferably 3% or less of the total thickness for every case. In other words, in order to obtain greater effects as describe above, it is sufficient to select a material having a larger difference between the changing rate of rigidity (G2) and the changing rate of weight (G1).

On the other hand, by comparison in terms of flexural modulus of elasticity in the same manner as in the Example 1, it is understood that the flexural modulus of elasticity of the base material 5 is within the range of $\frac{1}{15}$ or less of the flexural modulus of elasticity of the laminate material 6. This range includes all the types represented by the symbol ○ in the above Table 6.

Actually, the effects to be obtained will also be influenced by conditions such as the easiness of metal plating due to combination of the base material 5 and the laminate material 6. Therefore, it is preferable to select the best type for molding by considering such various conditions as well.

Next, samples actually having the above constructions were prepared for measurement of flexural modulus of elasticity. The samples contained an ABS resin as the base material 5 and a Cu-plating layer as the laminate material 6, with the total thickness being 2 mm and the thickness ratio of the plating layer being 10% or less (at intervals of 1%). Preparation of the samples, the conditions of measurement, the method of measurement and the like were based on JIS (Japanese Industrial Standard) K 9611.

Figure 14:
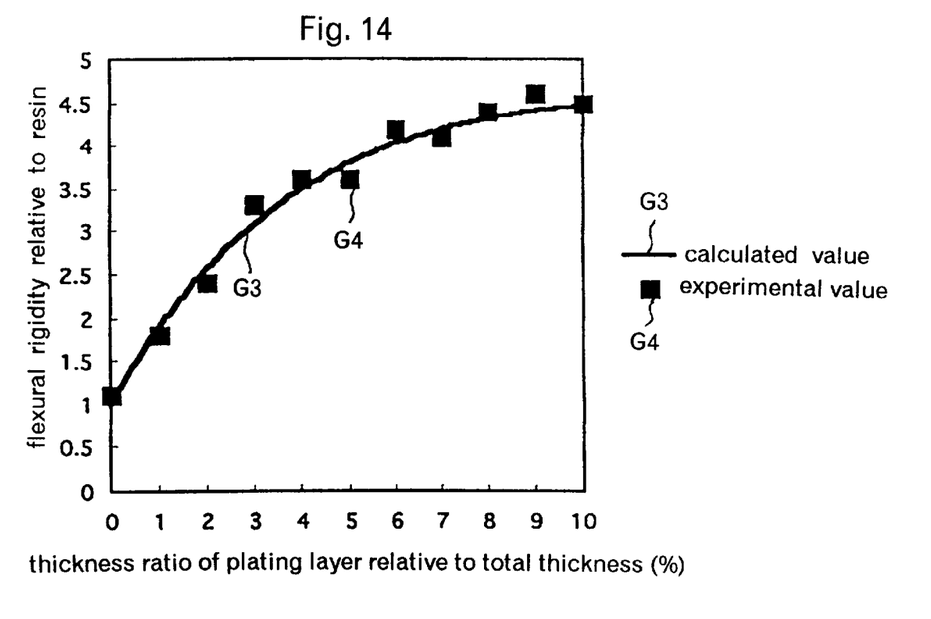
FIG. 14 is a graph showing a relationship between a relative flexural rigidity of a resin as a single body and the thickness ratio of a laminate material in a lamination on one surface according to the present invention.

FIG. 14 shows the results of this measurement and the results of calculation. From these results, it is understood that the measured values are almost identical to the calculated values and are within +10% of the calculated values, so that discussions may be made based on the calculated values.

As shown above, it is preferable that the following conditions are satisfied in order to form the intended laminate structure.

1) The laminate material 6 is selected to have a larger flexural modulus of elasticity than the base material 5. Also, the materials are selected so that the changing rate of rigidity (G2) relative to the thickness ratio of the laminate material 6 in the total laminate structure 4 is larger than the changing rate of weight (G1). The thickness of the laminate material 6 is determined so that the changing rate of rigidity (G2) is larger than the changing rate of weight (G1).

2) Preferably, a combination of the materials is selected so that the flexural modulus of elasticity of the base material 5 is $1/15$ or less of the flexural modulus of elasticity of the laminate material 6.

3) More preferably, the materials are selected so that the changing rate of rigidity (G2) is larger than the changing rate of weight (G1) by at least 1% and the thickness ratio of the laminate material 6 in the total laminate structure 4 is 3% or less.

As shown above, according to the present invention, in the same manner as in the Example 1, it is not necessary to use a reinforced material filled with a glass fiber or a carbon fiber having a poor fluidity for improvement of rigidity in a resin molded article, and an ordinary resin material can be used, thereby providing a good moldability for realizing a thin resin molded article. Also, since metal plating is used, the present invention can be carried out irrespective of the area of the resin molded article, and the costs of the materials can be reduced. Further, since the metal-plating layer has a higher flexural modulus of elasticity than the resin, the metal-plated resin molded article shows a great improvement in the flexural modulus of elasticity.

THIRD EXAMPLE

Figure 15:
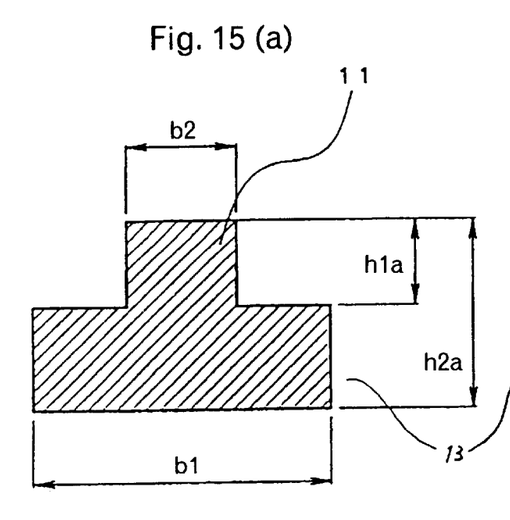
FIGS. 15(a), 15(b), and 15(c) are views for explaining a cross-sectional structure when a rib is disposed in a casing.

In this Example, the laminate structure of the present invention is applied to a rib. With reference to FIGS. 15(*a*) to 15(*c*), an explanation of this Example will be given.

Generally, a rib structure is provided to increase the strength of a casing. FIG. 15(*a*) shows a cross section of a casing 13 made of an ABS resin alone and having a rib 11 disposed on one surface thereof for increasing its rigidity. FIG. 15(*b*) shows a cross section of a casing that aims at further increasing the rigidity. The rigidity will of course increase by raising the height of the rib 11. However, this provides a disadvantage in scale reduction of the casing 13. On the other hand, in a casing 13 shown in FIG. 15(*c*), a rib 11 is coated with a metal 12 or the like having a large elastic modulus so that the same rigidity as the casing of FIG. 15(*b*) may be obtained without increasing the height of the rib 11 as in FIG. 15(*b*), whereby the increase in height of the rib 11 is made smaller.

In this Example, a rigidity two times larger than that of the casing 13 of FIG. 15(*a*) was realized with only a small increase in height of the rib 11, by using an ABS resin as a base material of the casing 13 and the rib 11 and using Cu as the coating material 12 for plating. Hereafter, an explanation of this Example will be given by using concrete numerical values.

In a casing 13 of FIG. 15(*a*), it is assumed that the total thickness of the ABS structure (casing and rib) is 4 mm, the thickness of the ABS casing 13 is (h2a−h1a)=2 mm, the width of the casing 13 is b1=10 mm, the height of the rib 11 is h1a=2 mm, and the width of the rib 11 is b2=4 mm. In order to double the rigidity of the casing 13 having this cross section, the total thickness of the ABS structure (casing and rib) is h2b=5.034 mm as shown in FIG. 15(*b*). Since the thickness of the casing 13 is (h2b−h1b)=2 mm which is the same as that of FIG. 15(*a*), the height of the rib 11 is h1b=3.034 mm. As a result, the height of the rib 11 is larger than that of FIG. 15(*a*) by about 1 mm.

Next, referring to FIG. 15(*c*), a Cu plating 12 is performed on an upper surface of the rib 11 made of an ABS base material. In FIG. 15(*c*), the thickness of the ABS casing 13 is (h2a−h1a)=2 mm, the thickness of the ABS rib 11 is h1a=2 mm, and the total thickness of the ABS structure (casing and rib) is h2a=4 mm, in the same manner as in FIG. 15(*a*). In order to double the rigidity of the casing 13 in the same manner as in FIG. 15(*b*), the Cu plating 12 is performed on an upper surface of the rib 11. As a result, the thickness of the plating 12 is h3c=112 $\mu$m, whereby the total thickness of the rib 11 is h1c=2.112 mm and the total thickness of the structure (casing and rib) is h2c=4.112 mm.

As a result of this, the ratio of the thickness h3c of the plating layer 12 relative to the thickness h2c of the total structure (casing and rib) is 2.8%, and the increase in weight is about 1.1 times as large as that of FIG. 15(*a*) which uses a single material. Also, the same rigidity is obtained and the rib height is reduced by about 1 mm as compared with the case of FIG. 15(*b*) in which the casing is fabricated with a single resin.

In the above Example, the explanation has been made on a case where a metal plating is performed only on a surface of the rib. However, the same effects would of course be obtained by performing a metal plating entirely over one surface or both surfaces of the rib within the range of the above Example.

As shown above, the metal plating layer can be formed only on a necessary portion of the surface of a resin molded article by masking before the plating process. Therefore, by using a metal plating layer instead of a conventional reinforced rib, the resin molded articles can be fabricated in a smaller size because it eliminates the need for a reinforced rib having a large height.

The laminate structure of the present invention can be applied to various fields, for example, as a casing for a portable electronic video device such as a camera, video-incorporated camera, or a digital camera, as a casing for a portable information or communication terminal such as a notebook-type personal computer, a pocket computer, an electronic calculator, an electronic pocket notebook, a PDC, a PHS, or a portable telephone, as a casing for a portable electronic audio device such as an MD, a cassette headphone stereo set, or a radio, and as a casing for a domestic electric appliance such as a liquid crystal TV, a monitor, a telephone, a facsimile apparatus, or a hand scanner.

As will be apparent from the above descriptions, the laminate structure of the present invention provides the following effects.

(1) The moldability is good, thereby facilitating fabrication of a thin laminate structure with reduced material costs.

(2) Since the flexural modulus of elasticity of the metal plating layers is higher than that of the resin of the base material, the resin molded article subjected to the metal plating exhibits an extremely improved elastic modulus of elasticity.

(3) By further reducing the thickness ratio of the metal plating layers, it is possible to obtain a thinner and lighter laminate structure having a higher rigidity as compared with a special resin using a reinforced material or the like.

(4) The laminate structure can be applied to casings for use in various fields, whereby a flexible molded article can be obtained which is light, thin, short, and small and has a high rigidity.

Another advantage of the laminate structure of the present invention is that, because a dense metal layer is formed on a surface of a molded article, it is possible to obtain a better electromagnetic wave shielding property than an electromagnetic wave shielding layer obtained by coating or an electromagnetic wave shielding material obtained by a metal fiber. Also, since the metal plating layer acts as a flame-resistant wall against a flame, the laminate structure of the present invention has a more excellent flame-resistance than a molded article made of resin alone, and also produces an effect of reducing the costs of the materials because a resin having a low flame retardancy can be used.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What we claim is:

1. A laminate structure comprising:

a base material made of a resin and a laminate material made of a metal, the laminate material being laminated as one or more plating layers on one surface or on both surfaces of the base material, wherein the laminate material has a flexural modulus of elasticity larger than that of the base material and has a thickness such that a changing rate of rigidity of the total laminate structure relative to the thickness ratio of the laminate material in the total laminate structure is larger than a changing rate of weight of the total laminate structure relative to the thickness ratio of the laminate material in the total laminate structure.

2. The laminate structure of claim 1, wherein the flexural modulus of elasticity of the base material is $\frac{1}{15}$ or less of the flexural modulus of elasticity of the laminate material.

3. A laminate structure of claim 1, wherein the layers of the laminate material are laminated on both surfaces of the base material, the changing rate of rigidity of the total laminate structure relative to the thickness ration of the laminate material in the total laminate structure is larger by at least 1% than the changing rate of weight, and the thickness ratio of the laminate material in the total laminate structure is 25 % or less.

4. The laminate structure of claim 3, wherein the thickness ratio of the laminate material in the total laminate structure is 5% or less.

5. The laminate structure of claim 3, wherein the base material has a thickness of 0.3 to 10 mm, and the laminate material has a total thickness of 0.015 to 2.5 mm.

6. The laminate structure of claim 1, wherein the layers of the laminate material are laminated on one surface of the base material, the changing rate of rigidity of the total laminate structure relative to the thickness ratio of the laminate material in the total laminate structure is larger by at least 1 % than the changing rate of weight, and the thickness ratio of the laminate material in the total laminate structure is 6% or less.

7. The laminate structure of claim 6, wherein the thickness ratio of the laminate material in the total laminate structure is 3% or less.

8. The laminate structure of claim 6, wherein the base material has a thickness of 0.3 to 10 mm, and the laminate material has a total thickness of 0.009 to 0.6 mm.

9. The laminate structure of claim 1, wherein the resin of the base material is acrylonitrile-butadiene-styrene resin, polyamide resin, polycarbonate resin, polypropylene resin, polyacetal resin, polybutylene-terephthalate resin, or a mixture thereof, and the metal of the laminate material is Cu, Cr, Fe, or Ni.

10. The laminate structure of claim 1, wherein the laminate material comprises two or more plating layers.

11. The laminate structure of claim 10, wherein the laminate material comprises a nonelectrolytic plating layer of Ni laminated on the base material and an electrolytic plating layer of Cr laminated thereon.

12. The laminate structure of claim 1, wherein the laminate structure is a casing.

13. The laminate structure of claim 12, wherein the casing is used in a portable information or communication device or in an electronic video device.

14. The laminate structure of claim 13, wherein the casing is used in a portable telephone.

15. A laminate structure comprising:

a base material made of a resin and a laminate material made of a metal, the laminate material being laminated as one or more plating layers on one surface or on both surfaces of the base material, wherein the laminate material has a flexural modulus of elasticity larger than that of the base material and has a thickness such that a changing rate of rigidity of the total laminate structure which is defined by a product, of the flexure modulus of elasticity and a cross-sectional secondary moment relative to the thickness ratio of the laminate material in the total laminate structure is larger than a changing rate of weight, the weight being a product of the density and the volume.

* * * * *